Patented Jan. 9, 1951

2,537,648

UNITED STATES PATENT OFFICE 2,537,648

RUBBERY COPOLYMER OF BUTADIENE AND STYRENE PLASTICIZED WITH A FURFURAL MONOARYL HYDRAZONE

Joseph C. Ambelang, Akron, Ohio, assignor to The Firestone Tire & Rubber Company, Akron, Ohio, a corporation of Ohio No Drawing. Application October 26, 1945,
Serial No. 624,936

18 Claims. (Cl. 260—30.4)

This invention relates to softeners and tackifiers for rubber-like copolymers of butadiene and styrene, such as are more commonly referred to as GR-S. The invention includes the improved product and the method of obtaining the improvement.

There are various desirable effects produced by this type of softener. For instance, it improves the extruding properties of GR-S during the "tubing" of tire treads. Since the compounded rubber is made more plastic, it extrudes more rapidly, and a smoother tread results. Also, less work is done in the extrusion process; hence less heat is produced, and there is less danger of "scorching" or prevulcanization during the process. Because of the increased plasticity and tack of tire stocks prepared according to this invention, small amounts of the usual tackifiers may be added to produce the adhesive strength required for tire building.

The invention makes possible the use of stiffer GR-S stocks with the resulting recognized advantages. Thus, an 80-Mooney copolymer (a copolymer with a Mooney L-4/212° F. of 80—i. e., a plasticity of 80 after 4 minutes at 212° F. on a Mooney plastometer using the large rotor) can be made as plastic and as readily processed as a regular 50-Mooney copolymer; yet the vulcanizate retains the superior properties of the vulcanizate from a stiffer copolymer.

According to this invention GR-S copolymer is made plastic and tacky by treatment with a furfural monoaryl hydrazone. The plasticizing and tackifying action persist after the copolymer has been compounded with the usual materials. The furfural monoaryl hydrazone may be added to the copolymer at any suitable stage of the process; e. g., before coagulation or after coagulation, and before or after drying. In the latter case the furfural monoaryl hydrazone must be made to react on the copolymer either by aging for a period of ten days or more or by heating. None of these various treatments produces any substantial change in the properties of the ultimate vulcanized rubber.

The softener and tacifier of this invention has the following formula:

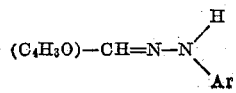

in which Ar is aryl or substituted aryl. Examples of suitable compounds are:

Furfural phenylhydrazone
Furfural tolylhydrazone
Furfural 2,3-dimethylphenylhydrazone
Furfural p-ethylphenylhydrazone
Furfural alpha-naphthylhydrazone
Furfural m-chlorophenylhydrazone
Furfural o-bromophenylhydrazone Furfural phenylhydrazone is a preferred compound.

The amount of the softener and tackifier which is used depends upon the effect desired. Ordinarily, about 2 per cent up to 5 per cent (on the copolymer) will be satisfactory. The range of ½ per cent to 10 per cent includes all usual formulae. The following examples illustrate the invention:

Example 1

Two per cent (on the copolymer) of the following phenylhydrazones were milled into GR-S. The plasticity (recorded as "ML-4/212° F.") of the milled stock was evaluated on the Mooney plastometer before and immediately after 18 hours' storage at 135° F. These plasticities are recorded below:

| Phenylhydrazone | ML-4/212° F. | |
|---|---|---|
| | Initial | After Storage |
| Furfural phenylhydrazone | 25 | 6 |
| Benzophenone phenylhydrazone | 25 | 26 |
| Acetophenone phenylhydrazone | 34 | 45 |
| Blank | 25 | 27 |

Only the furfural phenylhydrazone softened the polymer.

Example 2

Two parts (per 100 parts of copolymer) of furfural phenylhydrazone were dispersed in GR-S latex. The copolymer was coagulated and dried at 70° C. for 20 hours. Another portion of the GR-S latex without the added furfural phenylhydrazone was coagulated and dried in the same manner as a control. After drying, the ML-4/212° F. plasticity of the former was 14 compared to 42 for the latter.

Example 3

Two parts of furfural phenylhydrazone were milled into GR-S copolymer and the mixture allowed to age at room temperature for two weeks. The rubber was then compounded in the following tread formula:

|  | Example | Control |
|---|---|---|
| GR-S+furfural phenylhydrazone | 100 | |
| GR-S | | 100 |
| Zinc oxide | 5 | 5 |
| Sulfur | 2 | 2 |
| Accelerator | 1.2 | 1.2 |
| Coal-tar softener | 5 | 5 |
| Channel black | 50 | 50 |

The uncured stock was then tested on a plastometer of the type described in Dillon et al. 2,045,548 and known as the Firestone extrusion plastometer, and the example required 134 seconds (as compared with 225 seconds for the control) to extrude a constant volume through a given opening under identical standard conditions.

The properties of the two vulcanizates after curing at 300° F. compared favorably as shown by the following test results:

|  | Cure | Example | Control |
|---|---|---|---|
| | Minutes | | |
| Modulus 400% | 60 | 1,825 | 1,125 |
| | 90 | 1,875 | 1,775 |
| | 120 | 1,975 | 2,125 |
| Tensile | 60 | 2,550 | 1,900 |
| | 90 | 2,800 | 2,650 |
| | 120 | 2,700 | 2,600 |
| Elongation | 60 | 540 | 570 |
| | 90 | 550 | 550 |
| | 120 | 520 | 470 |

Example 4

Two parts (per 100 parts of copolymer) of furfural phenylhydrazone were dispersed in GR-S latex before coagulation. This and another portion of latex which contained no furfural phenylhydrazone and served as a control, were coagulated and dried at the same time. Then, without aging, the two were compounded according to the following tread stock formula:

|  | Example | Control |
|---|---|---|
| Channel black | 45 | 45 |
| Zinc oxide | 2.4 | 2.4 |
| Sulfur | 1.7 | 1.7 |
| Accelerator | 1.2 | 1.2 |
| Antioxidant | 0.6 | 0.6 |
| Tar oils | 6.6 | 6.6 |
| Stearic acid | 0.5 | 0.5 |
| GR-S+furfural phenylhydrazone | 100 | |
| GR-S | | 100 |

The plasticity of the compounded stock (measured on the Firestone plastometer) had been reduced from 26.2 (the extrusion time in seconds for the control) to 15.4.

The vulcanizate cured at 280° F. had the following properties:

|  | Cure | Example | Control |
|---|---|---|---|
| | Minutes | | |
| 300% Modulus | 20 | 725 | 575 |
| | 40 | 775 | 550 |
| | 80 | 800 | 895 |
| Tensile | 20 | 1,800 | 1,400 |
| | 40 | 1,600 | 1,725 |
| | 80 | 1,875 | 1,475 |
| Elongation | 20 | 560 | 550 |
| | 40 | 510 | 600 |
| | 80 | 540 | 640 |

Example 5

Three parts (on the copolymer) of furfural phenylhydrazone were dispersed in GR-S latex before coagulation. It was coagulated and dried at 122° F. and compounded according to the following formula for carcass stock together with comparable coagulum used as a control:

|  | Example | Control |
|---|---|---|
| Channel black | 30 | 30 |
| Zinc oxide | 5 | 5 |
| Sulfur | 3 | 3 |
| Accelerator | 2.3 | 2.3 |
| Tackifying resins | 9.5 | 12.5 |
| GR-S+furfural phenylhydrazone | 103 | |
| GR-S | | 100 |
| Total | 152.8 | 152.8 |

The tack was good in the stock of the example as compared with that of the control which was only fair. The test results on samples cured at 280° F. recorded below show the stock had good physical properties:

|  | Cure | Example | Control |
|---|---|---|---|
| | Minutes | | |
| 300% Modulus | 20 | 550 | 375 |
| | 40 | 1,050 | 700 |
| | 80 | 1,225 | 1,025 |
| Tensile | 20 | 2,450 | 2,275 |
| | 40 | 2,200 | 1,575 |
| | 80 | 1,825 | 1,700 |
| Elongation | 20 | 730 | 710 |
| | 40 | 470 | 460 |
| | 80 | 400 | 410 |

Example 6

This example illustrates how high Mooney stock may be given an uncured plasticity comparable to low Mooney material without appreciably altering the preferred properties of the high Mooney vulcanizate.

One and one-half parts (per 100 parts of copolymer) of furfural phenylhydrazone were dispersed in high Mooney GR-S latex. This latex was then coagulated and dried 2 hours at 230° F.

The following table illustrates the effect of different amounts of the softener on high Mooney GR-S latex, after such drying, compared to untreated, dried latices of high Mooney GR-S and regular specification GR-S:

| | ML-4/212° F. |
|---|---|
| High Mooney GR-S (untreated) | 71 |
| High Mooney +2% furfural phenylhydrazone | 46 |
| High Mooney +1.5% furfural phenylhydrazone | 53 |
| Regular GR-S specification | 45–55 |

The copolymer containing 1.5 per cent furfural phenylhydrazone dried as described, together with untreated, dried latices of high Mooney and regular Mooney GR-S, was compounded according to the tread-stock formula given in the following table. Following the formula, the table gives the Mooney of the compounded stocks. Below this, properties of the vulcanizates cured at 280° F. for different periods are recorded. Below this are recorded results of tests on stocks cured 60 minutes at 280° F., using a Firestone flexometer (of the type described in Allen 2,048,314) using a 250-pound load and 0.3 inch throw.

| Formula: | High Mooney | Example | Regular |
|---|---|---|---|
| High modulus furnace black | 53 | 53 | 53 |
| Zinc oxide | 2.4 | 2.4 | 2.4 |
| Mineral rubber | 5.7 | 5.7 | 5.7 |
| Petroleum oil | 1.9 | 1.9 | 1.9 |
| Sulfur | 1.7 | 1.7 | 1.7 |
| Accelerator | 1.0 | 1.0 | 1.0 |
| Antioxidant | 0.6 | 0.6 | 0.6 |
| High Mooney GR-S | 100 | | |
| High Mooney GR-S+furfural phenyl hydrazone | | 100 | |
| Regular GR-S | | | 100 |
| ML-4/212° F. of Compounded Stocks | 65 | 45 | 46 |

| | Cure | High Mooney | Example | Regular |
|---|---|---|---|---|
| Tests on Vulcanizates: | Minutes | | | |
| Modulus (300%) | 30 | 125 | 825 | 25 |
| | 60 | 1,075 | 975 | 775 |
| | 90 | 1,125 | 1,050 | 875 |
| Tensile | 30 | 425 | 220 | 200 |
| | 60 | 2,150 | 2,125 | 2,075 |
| | 90 | 2,075 | 2,175 | 2,050 |
| Elongation | 30 | 680 | 660 | 780 |
| | 60 | 510 | 580 | 620 |
| | 90 | 470 | 570 | 580 |
| Vulcanizates Aged 4 Days at 212° F.: | | | | |
| Tensile | 30 | 1,800 | 1,850 | 1,150 |
| | 60 | 1,825 | 2,025 | 1,375 |
| | 90 | 1,900 | 1,825 | 1,325 |
| Elongation | 30 | 260 | 220 | 190 |
| | 60 | 230 | 260 | 220 |
| | 90 | 280 | 270 | 200 |

| | High Mooney | Example | Regular |
|---|---|---|---|
| Firestone Flexometer: | | | |
| 3-Pound cold penetration | 47 | 48 | 51 |
| 3-Pound hot penetration | 63 | 65 | 70 |
| Running temperature °F | 243 | 246 | 253 |

It should be noted that although the plasticity of the compounded uncured stock closely approximates that of specification (low Mooney) GR-S, the properties of the vulcanizate follow closely the properties of a high Mooney vulcanizate.

The invention is not limited to the materials mentioned or the treatments disclosed. It is covered by the appended claims.

What I claim is:

1. An uncured rubber-like copolymer of butadiene and styrene which contains 0.5 to 10 per cent of a furfural monoaryl hydrazone in which the aryl group is of the class consisting of phenyl groups which are unsubstituted, halogen-substituted and substituted with a hydrocarbon-substituent of not more than four carbon atoms.

2. An uncured rubber-like copolymer of butadiene and styrene which contains 0.5 to 10 per cent of furfural phenyl-hydrazone.

3. A latex of a rubber-like copolymer of butadiene and styrene which contains 0.5 to 10 per cent of a furfural monoaryl hydrazone for softening and tackifying the copolymer, the aryl group being of the class consisting of phenyl groups which are unsubstituted, halogen-substituted, and substituted with a hydrocarbon substituent of not more than four carbon atoms.

4. A latex of a rubber-like copolymer of butadiene and styrene which contains 0.5 to 10 per cent of furfural phenyl-hydrazone for softening and tackifying the copolymer.

5. Undried latex coagulum of rubber-like copolymer of butadiene and styrene which contains 0.5 to 10 per cent of a furfural monoaryl hydrazone for softening and tackifying the copolymer, the aryl group being of the class consisting of phenyl groups which are unsubstituted, halogen-substituted, and substituted with a hydrocarbon substituent of not more than four carbon atoms.

6. Undried latex coagulum of rubber-like copolymer of butadiene and styrene which contains 0.5 to 10 per cent of furfural phenylhydrazone for softening and tackifying the copolymer.

7. Dried latex coagulum of rubber-like copolymer of butadiene and styrene softened and tackified by a furfural monoaryl hydrazone present therein, the aryl group being of the class consisting of phenyl groups which are unsubstituted, halogen-substituted, and substituted with a hydrocarbon substituent of not more than four carbon atoms.

8. Dried latex coagulum of rubber-like copolymer of butadiene and styrene softened and tackified by furfural phenylhydrazone present therein.

9. The method of treating latex of rubber-like copolymer of butadiene and styrene which comprises dispersing a furfural monoaryl hydrazone in the latex, coagulating, and then heating to dry the coagulum and to cause the hydrazone to soften and tackify it, the aryl group being of the class consisting of phenyl groups which are unsubstituted, halogen-substituted, and substituted with a hydrocarbon substituent of not more than four carbon atoms.

10. The method of treating latex of rubber-like copolymer of butadiene and styrene which comprises dispersing furfural phenylhydrazone in the latex, coagulating, and then heating to dry the coagulum and to cause the hydrazone to soften and tackify it.

11. The method of treating coagulum of a latex of rubber-like copolymer of butadiene and styrene which comprises mixing a furfural monoaryl hydrazone into the coagulum and then heating it to dry the coagulum and to cause the hydrazone to soften and tackify it, the aryl group being of the class consisting of phenyl groups which are unsubstituted, halogen-substituted, and substituted with a hydrocarbon substituent of not more than four carbon atoms.

12. The method of treating coagulum of a latex of rubber-like copolymer of butadiene and styrene which comprises mixing furfural phenylhydrazone into the coagulum and then heating it to dry the coagulum and to cause the hydrazone to soften and tackify it.

13. The method of treating dried coagulum of rubber-like copolymer of butadiene and styrene which comprises reacting a furfural monoaryl hydrazone with the copolymer so as to soften and tackify it, the aryl group being of the class consisting of phenyl groups which are unsubstituted, halogen-substituted, and substituted with a hydrocarbon substituent of not more than four carbon atoms.

14. The method of treating dried coagulum of rubber-like copolymer of butadiene and styrene which comprises reacting furfural phenylhydrazone with the copolymer so as to soften and tackify it.

15. The method of treating dried coagulum of rubber-like copolymer of butadiene and styrene which comprises mixing a furfural monoaryl hydrazone into it and then aging it to cause the hydrazone to soften and tackify it, the aryl group being of the class consisting of phenyl groups which are unsubstituted, halogen-substituted, and substituted with a hydrocarbon substituent of not more than four carbon atoms.

16. The method of treating dried coagulum of rubber-like copolymer of butadiene and styrene which comprises mixing furfural phenylhydrazone into it and then aging it to cause the hydrazone to soften and tackify it.

17. The method of treating dried coagulum of rubber-like copolymer of butadiene and styrene which comprises mixing a furfural monoaryl hydrazone into it and then heating it to cause the hydrazone to soften and tackify it, the aryl group being of the class consisting of phenyl groups which are unsubstituted, halogen-substituted, and substituted with a hydrocarbon substituent of not more than four carbon atoms.

18. The method of treating dried coagulum of rubber-like copolymer of butadiene and styrene which comprises mixing furfural phenylhydrazone into it and then heating it to cause the hydrazone to soften and tackify it.

JOSEPH C. AMBELANG.

REFERENCES CITED

The following references are of record in the file of this patent:

UNITED STATES PATENTS

| Number | Name | Date |
| --- | --- | --- |
| 2,018,644 | Williams | Oct. 22, 1935 |
| 2,280,484 | Gumlich | Apr. 21, 1942 |

FOREIGN PATENTS

| Number | Country | Date |
| --- | --- | --- |
| 849,171 | France | Aug. 7, 1939 |